J. C. EDWARDS.
SIGNAL DEVICE FOR VEHICLES.
APPLICATION FILED OCT. 14, 1913.
1,138,361.
Patented May 4, 1915.
2 SHEETS—SHEET 1.
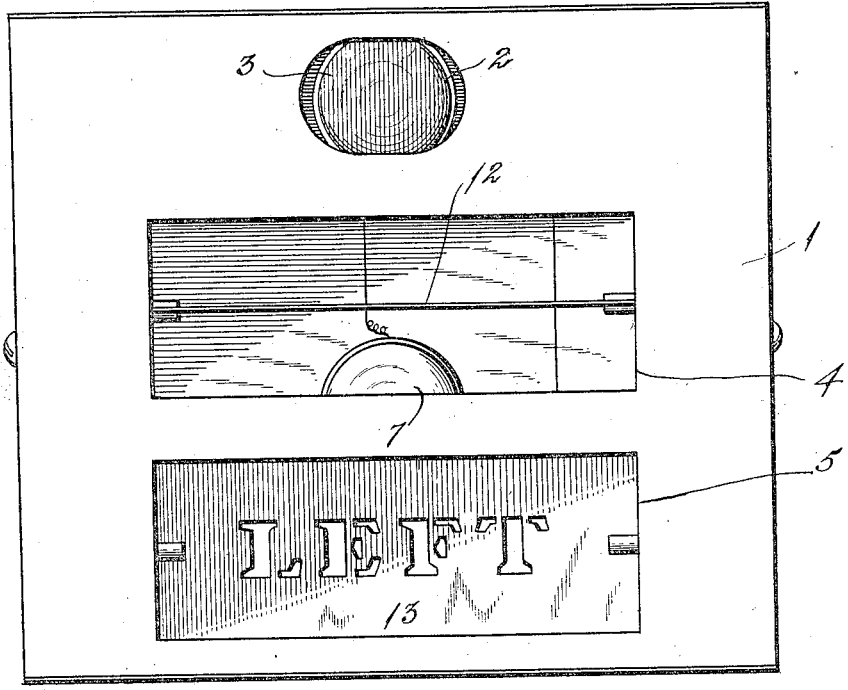
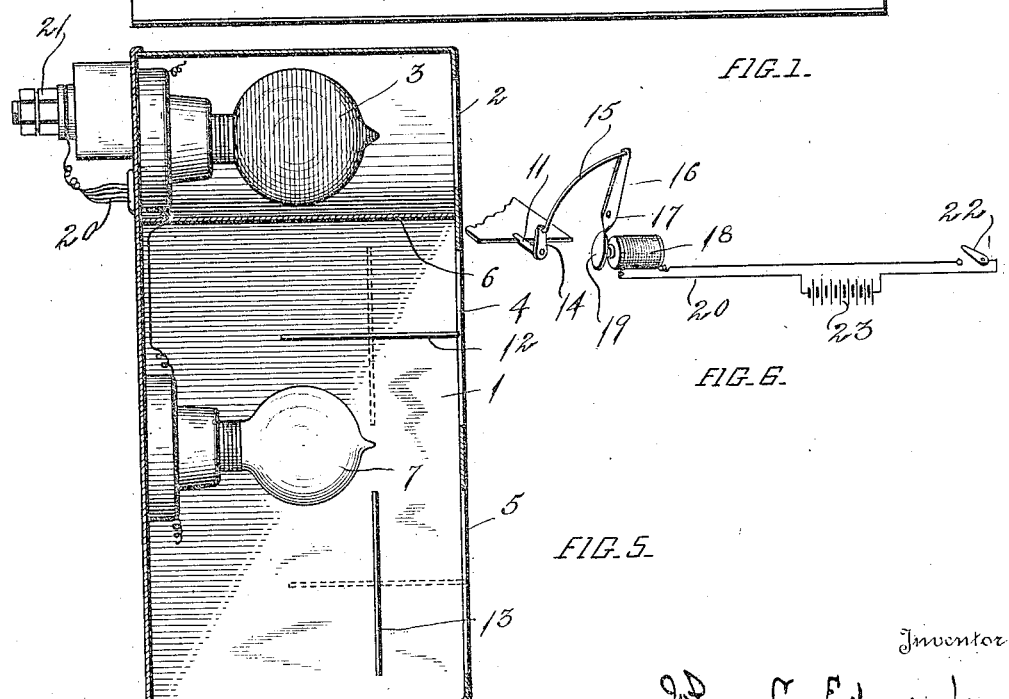

J. C. EDWARDS.
SIGNAL DEVICE FOR VEHICLES.
APPLICATION FILED OCT. 14, 1913.
1,138,361.
Patented May 4, 1915.
2 SHEETS—SHEET 2.
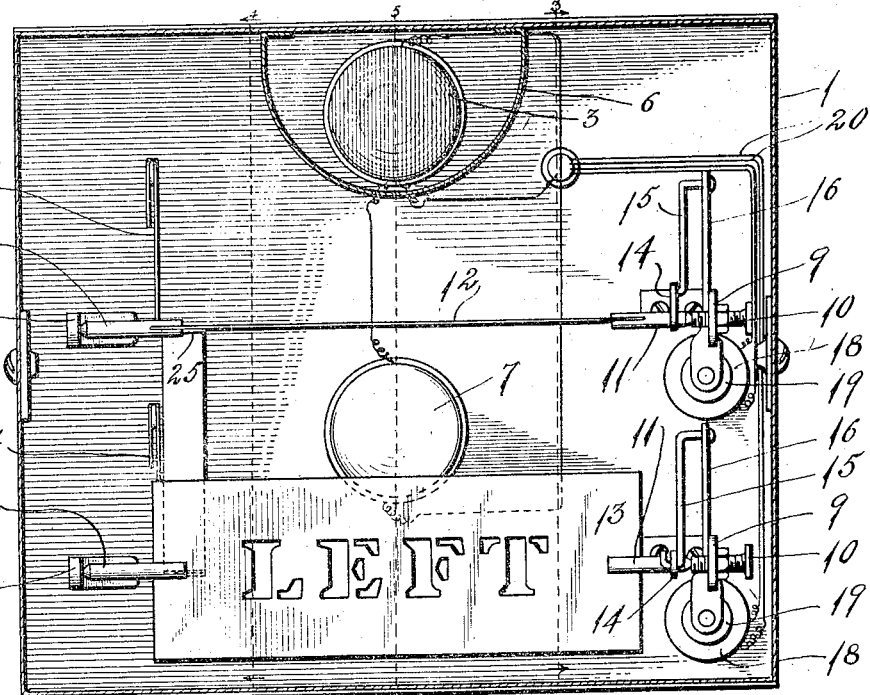
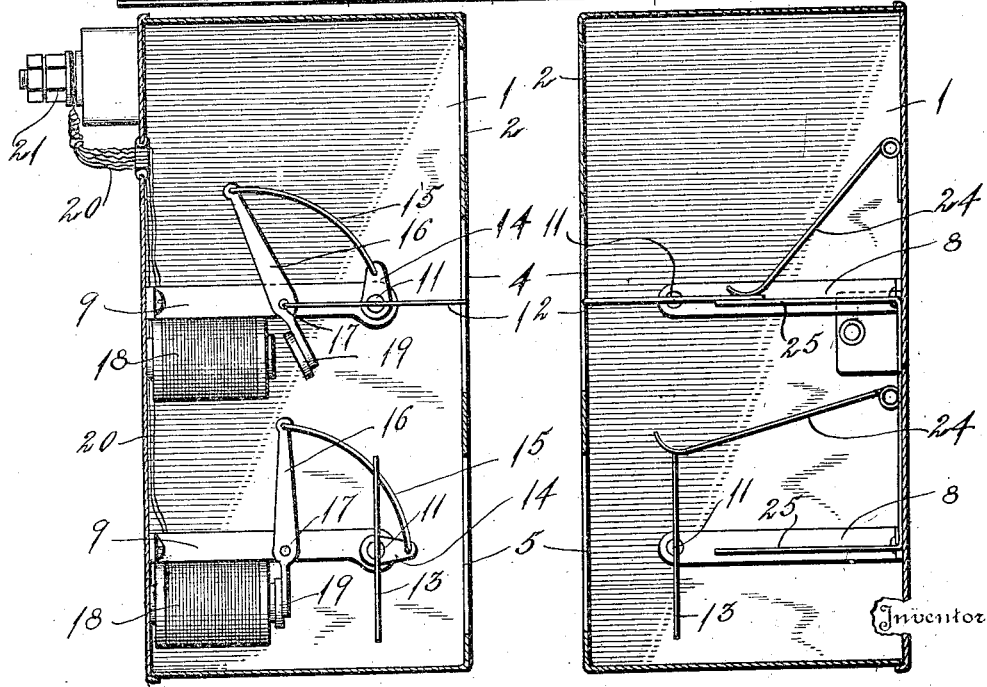

UNITED STATES PATENT OFFICE.

JOHN C. EDWARDS, OF MOBILE, ALABAMA.

SIGNAL DEVICE FOR VEHICLES.

1,138,361.  Specification of Letter Patent.  Patented May 4, 1915.

Application filed October 14, 1913. Serial No. 795,074.

*To all whom it may concern:*

Be it known that I, JOHN C. EDWARDS, citizen of the United States, residing at Mobile, in the county of Mobile and State of Alabama, have invented certain new and useful Improvements in Signal Devices for Vehicles; and I do hereby declare the following to be a full, clear, and exact description of the invention, such as will enable others skilled in the art to which it appertains to make and use the same.

My invention relates to improvements in signaling devices for automobiles and other vehicles, the object being to provide simple and efficient means whereby the operator of an automobile, or the driver of any other kind of a vehicle or carriage, may display at the rear of the same a signal to vehicles coming from the rear, which will give a warning that the vehicle in front intends to turn to the right or to the left, or otherwise regulate or change its movements, which change if unknown to the operators of the vehicles behind might in consequence of a deflection of its course, result in a collison between the vehicle in front and the one behind.

A further object is to provide improvements in this character which consists of a chamber illuminated by a single electric light, and provided with a plurality of apertures which are covered at certain times by opaque sheets having portions cut out in the form of letters, which spell " Right ", and " Left " and which sheets are under the control of the operator of the vehicle by means of switches preferably located adjacent the driver's seat, upon the steering post or adjacent the steering wheel, and combine with such changeable signaling device a constantly illuminated danger signal light.

A still further object of my invention is to provide a simple and compact device of the class specified which shall consist of the fewest parts in order to accomplish the desired result, the construction and finish being such that an efficient structure may be provided at comparatively little expense.

With these and other objects in view, the invention consists in certain novel features of construction and combinations and arrangement of parts as will be more fully hereinafter described and particularly pointed out in the claim.

In the accompanying drawings, Figure 1 is a front elevation of my improved signaling device. Fig. 2 is a front view with the face plate removed and showing the sign plates and their operating mechanism. Fig. 3 is a vertical sectional view taken on line 3, of Fig. 2. Fig. 4 is a similar view taken on line 4 of Fig. 2. Fig. 5 is a vertical section on line 5 of Fig. 2. Fig. 6 is a perspective view of a detail showing the means for operating the sign plates and a plan view of one of the electric circuits.

Referring to the drawings, the numeral 1 designates the casing of my improved vehicle signaling device, which is preferably formed of metal and is adapted to be secured to the rear of a vehicle by any suitable means. The face of said casing is provided near its upper edge with an approximately circular aperture 2, through which a constantly illuminated red danger lamp 3 may be seen, and is provided at its center portion and near its lower edge with substantially oblong apertures 4 and 5 through which the sign plates, hereinafter described, may be seen.

On the interior of the casing a partition 6 is provided, to prevent the red danger light from reflecting into the signal light compartment and to prevent the signal lamp from reflecting into the danger light chamber. An ordinary electric lamp 7 of suitable size and preferably showing a white light, is provided in the center of the signaling compartment and this lamp is also adapted to be constantly lighted during the period in which illumination is required.

Horizontally disposed arms 8 and 9 are secured to the back of the casing 1, above and below and at opposite sides of the electric lamp 7. The arms 9 are provided near their outer ends with threaded apertures through which pass screws 10. Pivotally connected to the arms 8 and to the ends of the screws 10 are short spindles 11 which support sign plates 12 and 13. The screws 10 are provided for the purpose of taking up wear on the ends of the spindles and also to adjust the same.

Rigidly connected to or provided upon the spindles on one side of the casing are levers 14 which are connected by means of links 15 with rocking levers 16, which are pivotally connected at 17 to the arms 9. Electro-magnets 18 are located adjacent the arms 9 and one end of the levers 16 have armatures 19 which coöperate with said magnets.

Electric wires 20 are connected for separate excitations of the magnets 18 and are passed out through the back of the casing to binding posts 21, which are connected by wires to a switch 22 and said switch 22 is adapted to be located within easy reach of the driver or operator of the vehicle. Separate switches and circuits are provided for each of said electro-magnets and a battery 23 is provided in each of said circuits.

The sign plates 12 and 13 are made of opaque material and have letters spelling "Right" and "Left" cut through them so that when either of the signs are swung into a vertical position the light from the lamp 7 shines through said cut out letters. Springs 24 are provided upon the back of the casing and their outer ends are adapted to bear against one edge of the sign plates to cause said sign plates to swing to a horizontal position when they are released by the electro-magnets. Stops 25 are provided to prevent the sign plates from swinging back too far. The interior of the casing and the sign plates are preferably coated with white or light paint or enamel to make the interior of said casing as bright as possible.

In the operation of my device, if the person operating the vehicle wishes to turn to the left, he will notify anyone behind him of his intentions by turning the switch which closes the circuit that operates the electro-magnet controlling the "left" sign. This is accomplished by the electro-magnet attracting its armature 19 which forces the lever 16 outwardly and causes the link 15 to rock the lever 14 and with it the sign plate and cause said sign plate to assume a vertical position. As the "left" sign takes a vertical position it practically closes the opening 5 in the casing and the light from the lamp 7 shining through the cut out letters exhibits the word "Left" to the person behind. When it is desired to turn to the right, the switch controlling the right electro-magnet is turned and the operation just described is duplicated with the exception that the operation is in connection with the "right" sign.

By the particular form of signs I employ and by my arrangement of their position relative to the electric lamp, a very efficient signaling device is provided and one in which the attention of the operator of the vehicle behind is not only attracted by the exhibiting of a sign, but also by the closing or shutting out of a light.

What I claim and desire to secure by Letters Patent is:—

A signaling device comprising a casing, a source of light provided approximately in the center of the interior of said casing, horizontally disposed arms provided in said casing above and below and at opposite sides of said source of light, sign plates provided with short spindles adapted to be pivotally connected to said arms, levers rigidly connected to certain of said spindles, rocking levers pivotally connected to certain of said arms, links provided between said levers and said rocking levers, armatures provided at one end of said rocking levers, and electro-magnets for attracting and releasing said armatures whereby the sign plates are adapted to be turned on their pivots.

In testimony whereof I affix my signature, in the presence of two witnesses.

JOHN C. EDWARDS.

Witnesses:
JOSEPH C. ZIRKLE,
ROBT. E. BARRY.